(12) United States Patent
Panchal et al.

(10) Patent No.: US 10,966,067 B2
(45) Date of Patent: Mar. 30, 2021

(54) INCREASE OF SPECTRAL CAPACITY OF EMBMS-CELL WHEN DEPLOYED AS A SUPPLEMENTARY DOWNLINK CARRIER

(71) Applicant: Apple Inc., Cupertino, CA (US)

(72) Inventors: Ajay Panchal, San Diego, CA (US); Hyung-Nam Choi, Hamburg (DE); Birgit Breining, Munich (DE)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 16/093,242

(22) PCT Filed: May 11, 2017

(86) PCT No.: PCT/US2017/032290
§ 371 (c)(1),
(2) Date: Oct. 12, 2018

(87) PCT Pub. No.: WO2017/197200
PCT Pub. Date: Nov. 16, 2017

(65) Prior Publication Data
US 2019/0090103 A1     Mar. 21, 2019

Related U.S. Application Data

(60) Provisional application No. 62/335,504, filed on May 12, 2016.

(51) Int. Cl.
*H04L 12/801* (2013.01)
*H04L 5/14* (2006.01)
(Continued)

(52) U.S. Cl.
CPC ............ *H04W 4/203* (2013.01); *H04L 41/042* (2013.01); *H04W 4/06* (2013.01); *H04W 72/005* (2013.01); *H04W 72/0446* (2013.01)

(58) Field of Classification Search
CPC ............ H04W 4/203; H04W 72/0446; H04W 72/005; H04W 4/06; H04W 74/044; H04W 4/18; H04L 41/042
See application file for complete search history.

(56) References Cited

U.S. PATENT DOCUMENTS

| | | | |
|---|---|---|---|
| 2010/0227611 A1* | 9/2010 | Schmidt | H04W 4/06 455/434 |
| 2013/0128765 A1 | 5/2013 | Yang et al. | |

(Continued)

FOREIGN PATENT DOCUMENTS

| | | |
|---|---|---|
| CN | 101707737 A | 5/2010 |
| CN | 102143434 A | 8/2011 |

(Continued)

OTHER PUBLICATIONS

International Search Report dated Aug. 17, 2017 for International Application PCT/US2017/032290.

(Continued)

*Primary Examiner* — Faruk Hamza
*Assistant Examiner* — Abusayeed M Haque
(74) *Attorney, Agent, or Firm* — Eschweiler & Potashnik, LLC

(57) ABSTRACT

Downlink spectral capacity of an eMBMS cell to be maximized for the eMBMS users. In one embodiment, supplementary eMBMS cells may be used together with a primary cell, in which the supplementary eMBMS cells broadcast only eMBMS content and the primary cell is used for uplink and downlink signaling. The primary cell may perform signaling for the corresponding supplementary cells. In this manner, signaling relating to configuring of the eMBMS cells may be offloaded to the non-eMBMS primary cell and eMBMS specific services can be fully utilized from the eMBMS cells. In a second embodiment, an eMBMS cell may be a standalone eMBMS cell that is not associated with (Continued)

a primary cell. In this embodiment, self-contained eMBMS signaling is defined. Additionally, eMBMS data may be broadcast in specified MBSN subframes. In this manner, a device, such as an eMBMS-only device, can independently receive eMBMS services.

12 Claims, 12 Drawing Sheets

(51) Int. Cl.
*H04W 84/18* (2009.01)
*H04L 29/06* (2006.01)
*H04W 4/20* (2018.01)
*H04W 4/06* (2009.01)
*H04W 72/00* (2009.01)
*H04L 12/24* (2006.01)
*H04W 72/04* (2009.01)

(56) References Cited

U.S. PATENT DOCUMENTS

| | | | |
|---|---|---|---|
| 2013/0155954 A1* | 6/2013 | Wang | H04W 76/27 370/328 |
| 2014/0086173 A1* | 3/2014 | Sadeghi | H04L 5/003 370/329 |
| 2016/0330011 A1* | 11/2016 | Lee | H04L 5/006 |
| 2017/0006447 A1* | 1/2017 | Bahta | H04W 4/90 |
| 2017/0006485 A1* | 1/2017 | Dalsgaard | H04W 24/10 |
| 2017/0111955 A1* | 4/2017 | Dalsgaard | H04W 76/28 |
| 2017/0295005 A1* | 10/2017 | Lee | H04W 36/0055 |

FOREIGN PATENT DOCUMENTS

| | | |
|---|---|---|
| CN | 104919827 A | 9/2015 |
| WO | 2015/094914 A1 | 6/2015 |

OTHER PUBLICATIONS

"Consideration on increasing number of MBSFN subframes." Agenda Item: 6.2.5.2. Source: ZTE. 3GPP TSG RAN WG1 Meeting #85, Nanjing, China, May 23-27, 2016. R1-164306. 2 pages.

"Standalone eMBMS carrier." Agenda Item: 7.3.5.3. Source: Ericsson. 3GPP TSG-RAN WG1 Meeting #84bis, Busan, Korea, Apr. 11-15, 2016. R1-163290. 2 pages.

"Draft Report of 3GPP TSG RAN WG2 meeting #70bis, Stockholm Sweden, Jun. 28-Jul. 2, 2010." Agenda Item: 2.2. Source: ETSI MCC. 3GPP TSG-RAN Working Group 2 meeting #71, Madrid, Spain, Aug. 23-27, 2010. R2-104221. 138 pages.

"Work plan for eMBMS enhancements in LTE." Agenda Item: 15. Source: Ericsson. 3GPP TSG-RAN WG3 Meeting #91bis, Bangalore, India, Apr. 11-15, 2016. R3-160857. 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)." 3GPP TS 36.300 V13.3.0 (Mar. 2016). Lte Advanced Pro. 295 pages.

International Preliminary Report on Patentability dated Nov. 22, 2018 for International Application PCT/US2017/032290.

* cited by examiner

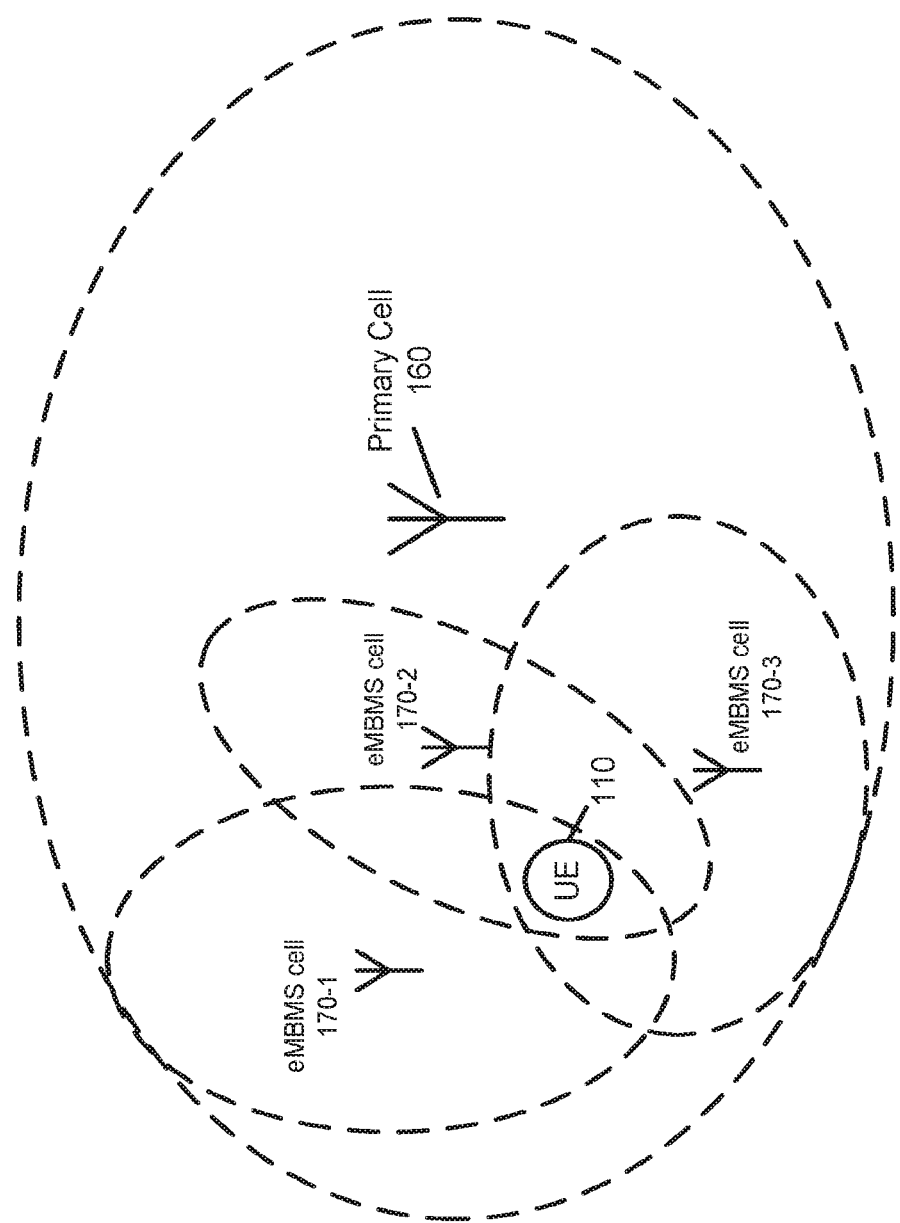

Key:

Unicast Subframe

Multicast Subframe

Key:

Multicast Subframe

INCREASE OF SPECTRAL CAPACITY OF EMBMS-CELL WHEN DEPLOYED AS A SUPPLEMENTARY DOWNLINK CARRIER

RELATED APPLICATIONS

This application is a National Phase entry application of International Patent Application No. PCT/US2017/032290 filed May 11, 2017, which claims priority to U.S. Provisional Patent Application No. 62/335,504, which was filed on May 12, 2016, entitled "MECHANISMS TO INCREASE SPECTRAL CAPACITY OF ENHANCED MULTIMEDIA BROADCAST MULTICAST SYSTEM CELLS WHEN DEPLOYED ON SUPPLEMENTARY DOWNLINK CARRIERS" in the name of Ajay Panchal et al. and is hereby incorporated by reference in its entirety.

BACKGROUND

Multimedia Broadcast Multicast Services (MBMS) is a point-to-multipoint interface specification for existing and upcoming Third Generation Partnership Project (3GPP) cellular networks, which is designed to provide efficient delivery of broadcast and multicast services, both within a cell as well as within the core network. When delivered through a Long Term Evolution (LTE) network, MBMS may be referred to as Evolved MBMS (eMBMS) Target applications for eMBMS include mobile television and radio broadcasting, live streaming video services, file delivery, and emergency alert services. Mobile video streaming is particularly foreseen to generate significant network data traffic in the future.

Existing eMBMS implementations can be limited in mixed carrier deployment scenarios where, on the same carrier, both unicast and eMBMS transmissions can occur concurrently. For example, one limitation is that maximum eMBMS spectral capacity of a cell may be limited to below 100 percent (e.g., 60% for Frequency Division Duplex (FDD) and 50% for Frequency Division Duplex (TDD)) utilization for eMBMS purposes. Additionally, existing specifications may not specify how eMBMS services can be received from a standalone eMBMS cell when no other cell (e.g., a primary cell or "PCELL") is present.

As an example, assume a television service provider would like to transmit eMBMS television services, using maximum spectral capacity, to television consumers. The television consumers may receive the video corresponding to the television services from one or more standalone eMBMS cells. The standalone eMBMS cells may not need to provide any uplink and/or unicast services. It would be desirable for the standalone eMBMS cells, when providing the television services, to use the maximum possible spectral capacity.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIG. 1B is a diagram illustrating an example of portions of a RAN consistent with a first embodiment;

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Techniques described herein may enable the downlink spectral capacity of an eMBMS cell to be maximized for the eMBMS users.

In one embodiment, supplementary eMBMS cells may be used together with a primary cell (PCELL), in which the supplementary eMBMS cells broadcast only eMBMS content and the primary cell is used for uplink and downlink signaling. The primary cell may perform signaling for the corresponding supplementary cells. In this manner, signaling relating to configuring of the eMBMS cells may be offloaded to the non-eMBMS primary cell and eMBMS specific services can be fully utilized from the eMBMS cells.

In a second embodiment, an eMBMS cell may be a standalone eMBMS cell that is not associated with a primary cell. In this embodiment, self-contained eMBMS signaling is defined.

Additionally, eMBMS data may be broadcast in specified MBSN subframes. In this manner, a device, such as an eMBMS-only device, can independently receive eMBMS services.

Figure 1A:
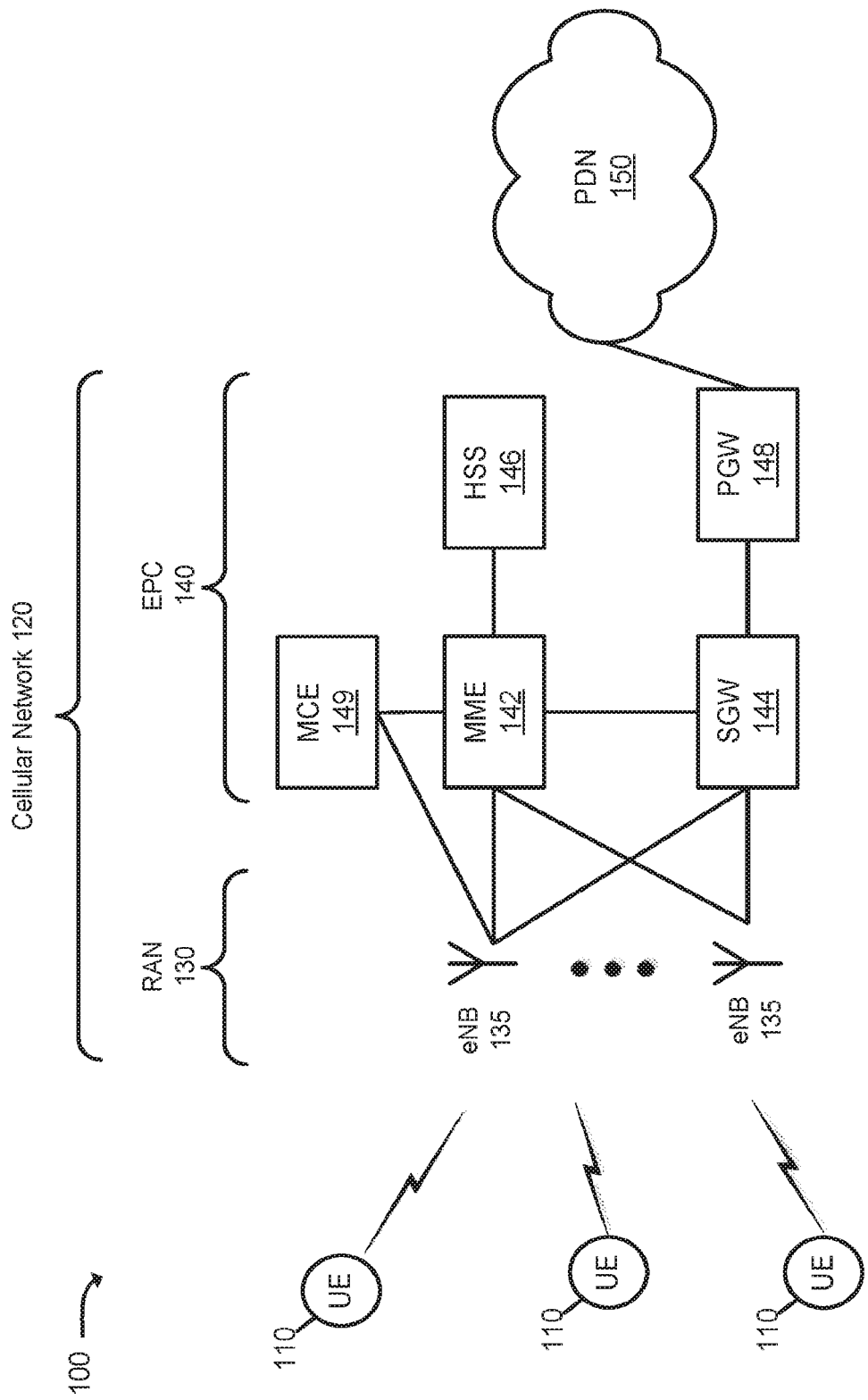
FIG. 1A is a diagram illustrating an example system in which systems and/or methods described herein may be implemented.

FIG. 1A is a diagram illustrating an example system 100 in which systems and/or methods described herein may be implemented. As illustrated, system 100 may include a number of User Equipments (UEs) 110, which may obtain network connectivity from cellular network 120. In 3GPP, cellular network 120 may include both the Radio Access Network (RAN) 130 and the core portion of the cellular network, which may be referred to as the Evolved Packet Core (EPC) 140.

UE 110 may include a portable computing and communication device, such as a personal digital assistant (PDA), a smart phone, a cellular phone, a laptop computer with connectivity to the wireless telecommunication network, an Internet of Things (IoT) device, a tablet computer, etc. UE 110 may also include a non-portable computing device, such as a desktop computer, a consumer or business appliance, or another device that has the ability to connect to a RAN (e.g., the LTE RAN and/or the non-3GPP access network) of the wireless telecommunication network. UE 110 may particularly be an eMBMS device that can receive multimedia broadcast services from cellular network 120.

RAN 130 may particularly include base stations, which, in the context of a 3GPP network, may be referred to as Evolved NodeBs (eNBs) 135. eNBs 135 may provide the air (radio) interface for wireless connections with UEs 110. eNBs 135 may, for example, implement the 3GPP Evolved Universal Mobile Telecommunications System (UMTS) Terrestrial Radio Access (E-UTRA) air interface. At least some of eNBs 135 may act as eMBMS broadcast devices and may broadcast data to one or more eMBMS capable UEs 110.

EPC 140 may include an Internet Protocol ("IP")-based network. EPC 140 may include a number of network devices, including a Mobility Management Entity (MME) 142, a Serving Gateway (SGW) 144, a Home Subscriber Server (HSS) 146, and a packet data network gateway (PGW) 148). Additionally, a Multi-cell/multicast Coordination Entity (MCE) 149 may be included, as part of EPC 140, to coordinate eMBMS communications. Through EPC 140, UEs 110 may communicate with an external network, such as packet data network (PDN) 150.

eNBs 135 may each include one or more network devices that receive, process, and/or transmit traffic destined for and/or received from UE 110 (e.g., via an air interface). eNBs 135 may include antennas and other logic necessary to wirelessly communicate with UEs 110. eNBs 135 may additionally communicate with other network devices in the core portion of the wireless telecommunications network. Although referred to as an "eNB," eNB 135 may generally represent any base station and/or radio access technology (RAT) node that is implemented in a cellular network as a network device designed to wirelessly communicate with UEs.

MME 142 may include one or more computation and communication devices that act as a control node for eNBs 135 and/or other devices that provide the air interface for the wireless telecommunications network. For example, MME 142 may perform operations to register UEs 110 with the cellular network, to establish user plane bearer channels (e.g., traffic flows), to hand off UE 110 to different eNBs 135, MME, or another network, and/or to perform other operations. MME 142 may perform policing operations on traffic destined for and/or received from UEs 110.

SGW 144 may aggregate traffic received from one or more eNBs 135 and may send the aggregated traffic to an external network or device via PGW 148. Additionally, SGW 144 may aggregate traffic received from one or more PGWs 148 and may send the aggregated traffic to one or more eNBs 135. SGW 144 may operate as an anchor for the user plane during inter-eNB handovers and as an anchor for mobility between different telecommunication networks.

HSS 146 may include one or more devices that may manage, update, and/or store, in a memory associated with HSS 146, profile information associated with a subscriber (e.g., a subscriber associated with UE 110). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 110. Additionally, or alternatively, HSS 146 may perform authentication, authorization, and/or accounting operations associated with the subscriber and/or a communication session with UE 110.

PGW 148 may include one or more network devices that may aggregate traffic received from one or more SGWs 144, and may send the aggregated traffic to an external network. PGW 148 may also, or alternatively, receive traffic from the external network and may send the traffic toward UE 110 (via SGW 144 and/or eNB 135).

MCE 149 may include one or more computation or communication devices that may perform admission control, allocation of radio resources throughout a Multimedia Broadcast Multicast Service Single Frequency Network (MBSFN) area, eMBMS session control signaling, and make decisions on radio configurations.

PDN 150 may include one or more packet networks, such as an Internet Protocol (IP) based packet network. PDN 150 may include a wide area network (WAN), a local area network (LAN), and/or combinations of WANs and LANs. Application servers or other computing devices, designed to control or aggregate data from UEs 110, may be connected to PDN 150.

FIG. 1B is a diagram illustrating an example of portions of RAN 130 consistent with the first embodiment. In FIG. 1B, eNBs 135 are illustrated as operating to create eMBMS cells. In general, eMBMS is a simulcast transmission technique in which multiple eMBMS cells may transmit identical waveforms at the same time. A MBSFN transmission from multiple cells within an MBSFN area may be seen as a single transmission by a UE.

The MBSFN shown in FIG. 1B may include primary cell 160 and supplementary eMBMS cells 170-1, 170-2, and 170-3 (collectively referred to as eMBMS cells 170 or supplementary eMBMS cells 170). Primary cell 160 may correspond to an eNB 135 that performs control signaling on behalf of eMBMS cells 170. More particularly, primary cell 160 may transmit eMBMS-cell configuration information to UE 110. eMBMS-specific signaling data may be received, by UE 110, from eMBMS cells 170. In this manner, all of the subframes transmitted by eMBMS cells 170 may potentially be used for eMBMS specific purposes. The first embodiment, as shown in FIG. 1B, may be particularly useful for downlink/uplink devices in which service providers may deploy eMBMS cells along with other downlink/uplink cells.

Figure 1C:
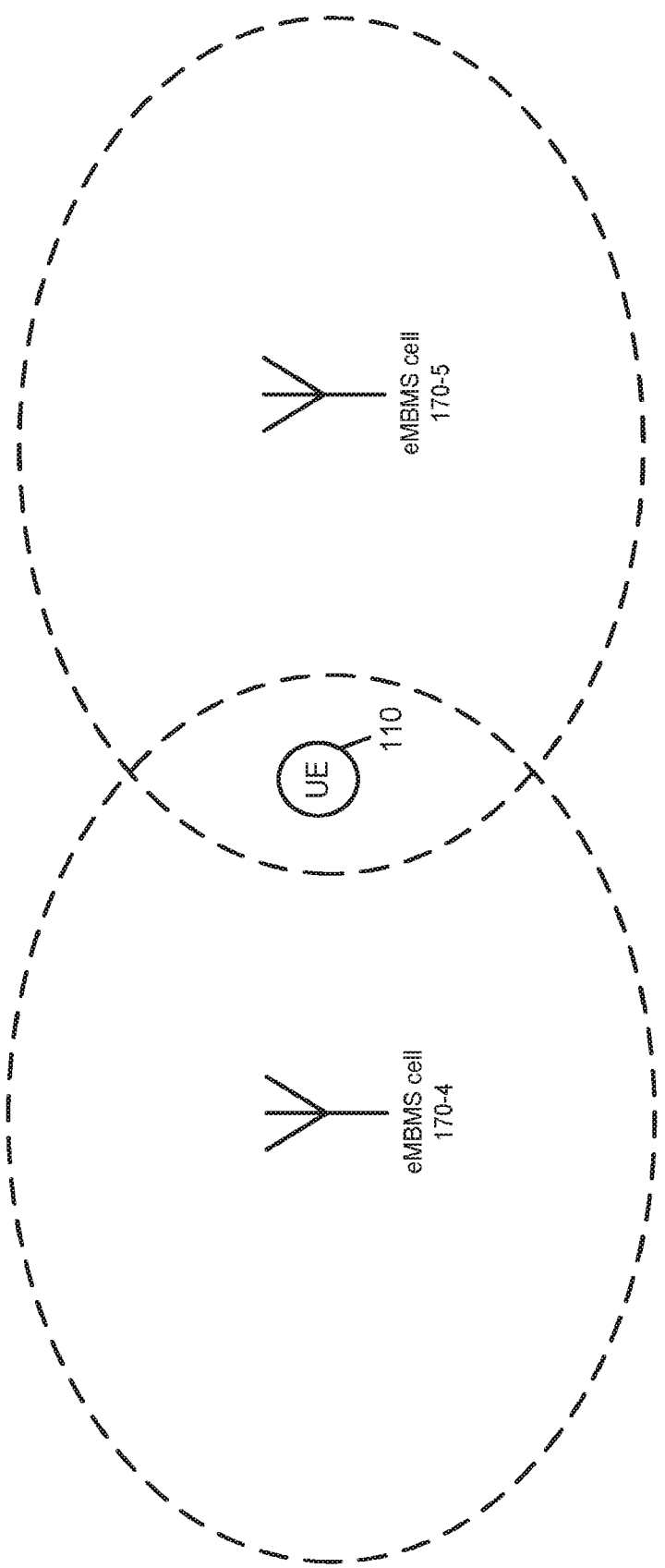
FIG. 1C is a diagram illustrating another example of portions of a RAN consistent with a second embodiment.

FIG. 1C is a diagram illustrating another example of portions of RAN 130. The architecture shown in FIG. 1C may be used to implement the second embodiment described herein, in which eMBMS cells may be standalone cells. In this embodiment, UE 110 (an eMBMS capable device) is capable of receiving eMBMS packets without support of a primary cell. In the example of FIG. 1C, UE 110 may be an eMBMS device that receives eMBMS services from two downlink-only cells, eMBMS cells 170-4 and 170-5. UE 110 may receive eMBMS signaling and data using self-contained MBSFN subframes transmitted from the eMBMS cells. The second embodiment may be desirable when the UE 110 does not have uplink or unicast capability (e.g., a dedicated television or Internet of Things (IoT) multicast receiving device) and requires only eMBMS services. For example, software updates to many IoT devices may be broadcast using the second embodiment.

The quantity of devices and/or networks, illustrated in FIGS. 1A, 1B, and 1C are provided for explanatory purposes only. In practice, there may be additional devices and/or networks; fewer devices and/or networks; different devices and/or networks; or differently arranged devices and/or networks than illustrated in FIGS. 1A, 1B, and 1C. Alternatively, or additionally, one or more of the devices of system 100 may perform one or more functions described as being performed by another one or more of the devices of system 100.

Figure 2A:
FIGS. 2A and 2B are diagrams illustrating spectral usage.
Figure 2A:
Figure 2A:
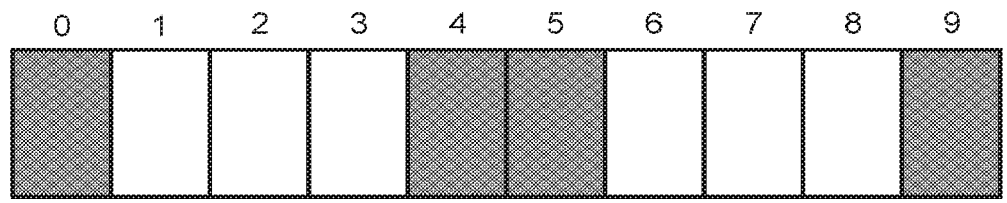
Figure 2B:
Figure 2B:
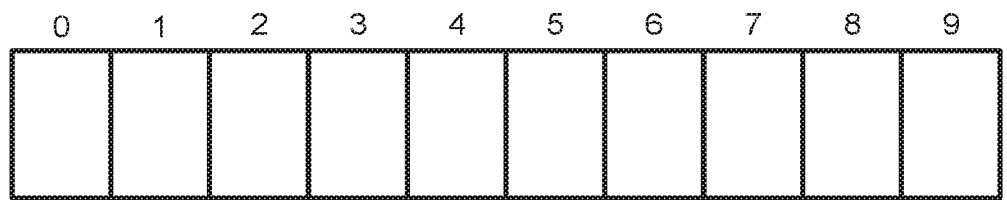

FIGS. 2A and 2B are diagrams illustrating existing eMBMS spectral usage (FIG. 2A) and eMBMS spectral usage consistent with usage of the techniques described herein (FIG. 2B), respectively. In FIG. 2A, a FDD cell is illustrated in which some of the 10 subframes of a frame are used for unicast communications (unicast subframes, illustrated via cross-hatching) and others of which are used for multicast communications (eMBMS multicast subframes). As shown in FIG. 2A, only 6 of 10 subframes in the radio frame are used for eMBMS reception and eMBMS services are therefore limited to a maximum of 60% of the potential total radio capacity of the cell. With the techniques described herein however, as shown in FIG. 2B, all of the subframes in a radio frame may be allocated used for eMBMS services, thus improving the maximum spectral capacity of the cell for eMBMS services.

Figure 3:
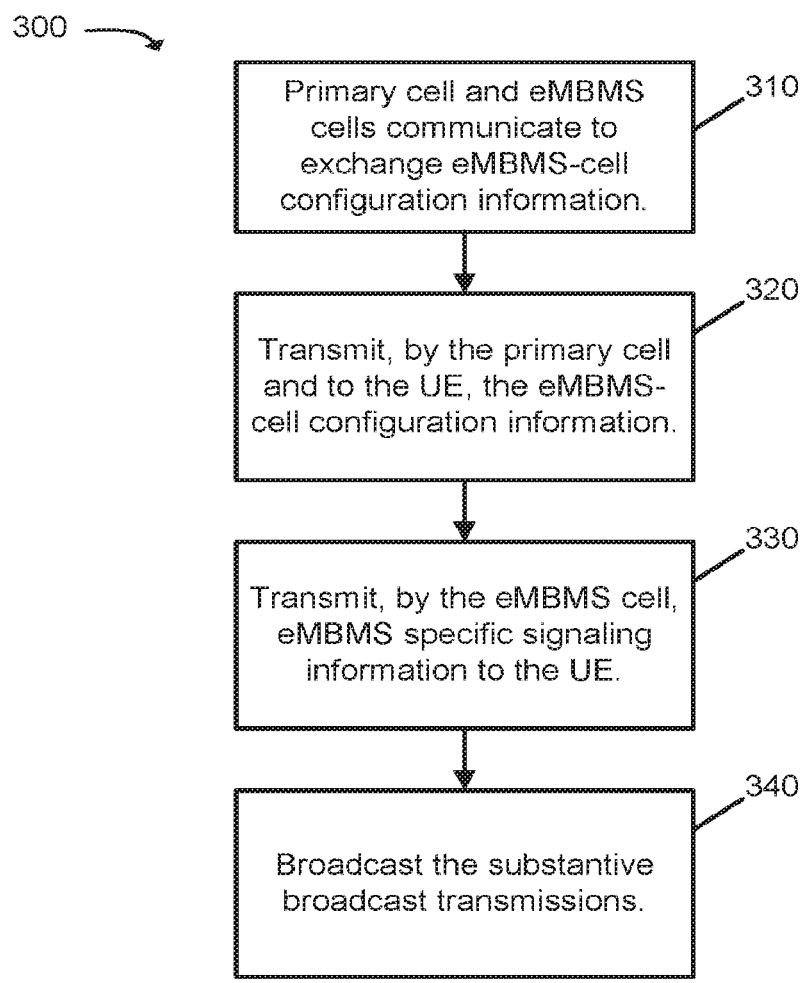
FIG. 3 is a flowchart illustrating an example process relating to increasing the spectral capacity of an eMBMS cell consistent with the first embodiment.

FIG. 3 is a flowchart illustrating an example process 300 relating to increasing the spectral capacity of an eMBMS cell consistent with the first embodiment.

Process 300 may include the eMBMS cells (e.g., eMBMS cells 170) and primary cell (e.g., primary cell 160) communicating to exchange eMBMS-cell configuration information (block 310). The eMBMS cells and the primary cell may communicate using, for example, the 3GPP X2 interface. The eMBMS cells may transmit messages to the primary cell that inform the primary cell of particular eMBMS parameters corresponding to the eMBMS cell(s). The parameters may include, for example, for each eMBMS cell, a unique identifier of the eMBMS cell, a physical cell identifier of the eMBMS cell, an identification of downlink carriers used by the eMBMS cell, bandwidth configuration information of the eMBMS cell, and/or other information Process 300 may further include transmitting, by the primary cell transmitting and via the air interface (i.e., the radio interface), the eMBMS-cell configuration information to the UE (block 320). As will be discussed in more detail below, the eMBMS-cell configuration information may be transmitted as a System Information Block (SIB) Type 2 message (SIB2) and/or SIB Type 3 (SIB3) message.

Process 300 may further include transmitting, by the eMBMS cell(s) and via the air interface, eMBMS specific signaling information to the UE (block 330). The eMBMS specific signaling information may include, for example, Multicast Control Channel (MCCH) information and Multicast Channel Scheduling Information (MSI). In one implementation, the signaling parameters may include MCCH Change Notifications, which may be a notification, from a supplementary eMBMS cell, of a change in the MCCH. That is, the eMBMS specific signaling information may pertain to Process 300 may further include broadcasting the substantive broadcast transmissions as Multicast Traffic Channels (MTCH) (block 340). The UE may receive the multicast traffic from multiple eMBMS cells.

Figure 4:
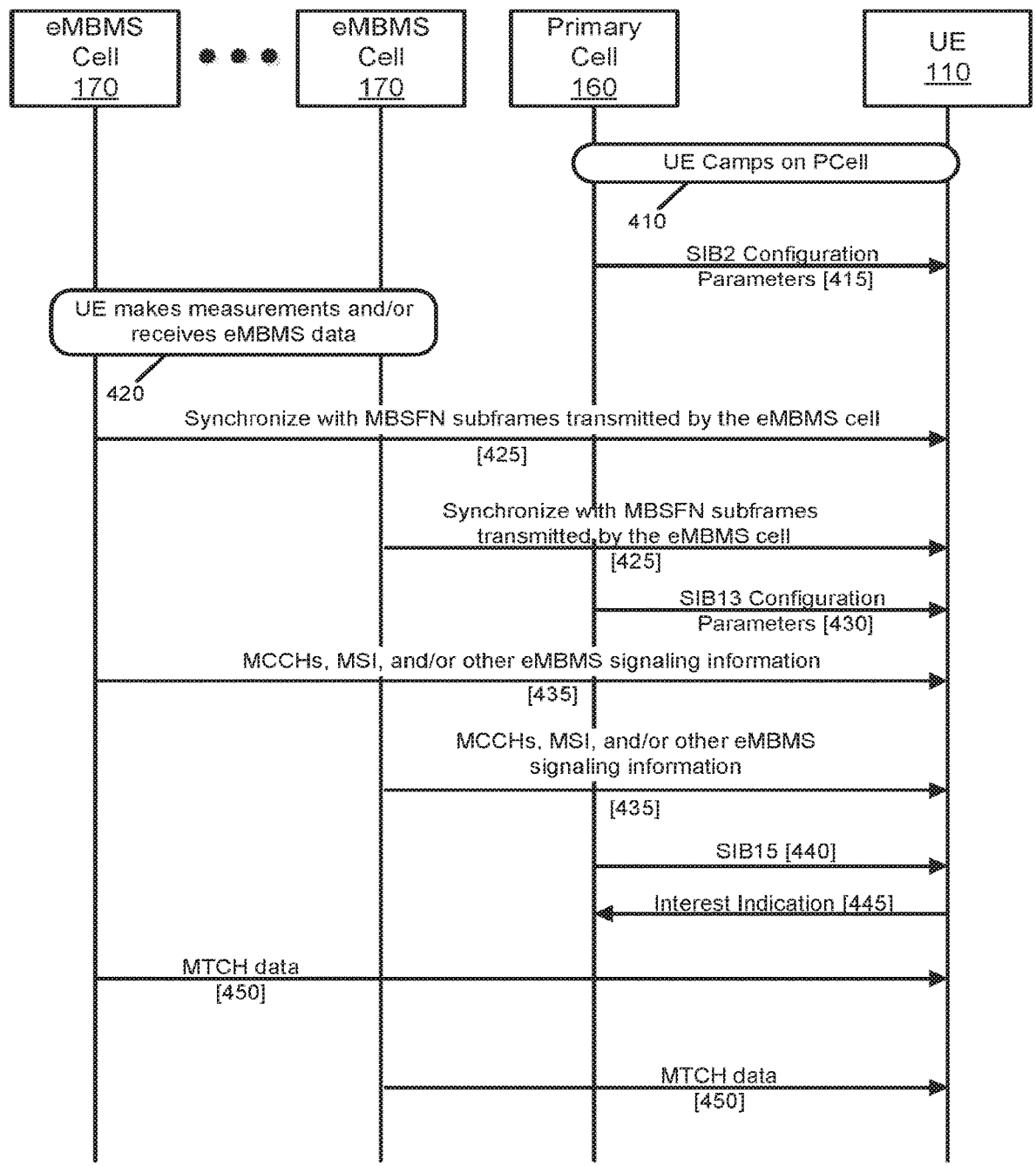
FIG. 4 is a signal flow diagram illustrating an example of signaling.

FIG. 4 is a signal flow diagram illustrating an example of signaling between eMBMS cells 170, primary cell 160, and UE 110. The illustrated signaling may be used to implement the first embodiment. An eMBMS cell, as previously mentioned, may refer to a cell that is used primarily or exclusively to broadcast eMBMS content.

As shown, UE 110 may camp on primary cell 160 (at 410, "UE camps on PCell"). UE 110 may, for example, receive unicast services from primary cell 160. "Camping" on a cell may refer to a UE in Idle mode that stays synchronized with the cell while waiting for incoming information.

The network (e.g., primary cell 160) may transmit parameters required to configure one or more of eMBMS cells 170 (at 415, "SIB2 configuration parameters"). The parameters may be communicated using a System Information Block (SIB) that conforms to the 3GPP standards, such as a 3GPP SIB Type 2 ("SIB2") block. One example of the parameters that may be included in SIB2 block are illustrated in Table I, below.

TABLE I

| System Information Block Type 2 |
|---|
| SIB2 existing PCELL parameters<br>For each eMBMS supplementary cell {<br>    CellIdentity<br>    PhysCellID<br>    dl-CarrierFreq<br>    dl-Bandwidth<br>    MBSFN-SubframeConfigList -- Optional<br>} |

As shown in Table 1, the SIB2 block may include a number of parameters that correspond to existing configuration parameters to configure a UE for eMBMS services ("SIB2 existing PCELL parameters"). The SIB2 block may additionally include parameters that define eMBMS-cell specific configuration information. For example, for each eMBMS cell that is supported by primary cell 160, the SIB2 block may include the parameters: CellIdentity, PhysCellID, dl-CarrierFreq, dl-Bandwidth, and MBSFN-SubframeConfigList (optional parameter).

The parameter CellIdentity may be used to unambiguously identify a cell within a public land mobile network (PLMN), such as a PLMN defined in 3GPP Technical Specification (TS) 36.331. This parameter may identify each eMBMS cell.

The parameters PhysCellID and dl-CarrierFreq may be eMBMS cell identification parameters that correspond to a physical cell identifier and an indication of downlink E-UTRA carrier frequency, respectively. These 2 parameters may be used by UE 110 to synchronize with the corresponding eMBMS cells 170. In some implementations, other parameters needed to synchronize with the eMBMS cells may also be included in the SIB2 block. For example, a parameter identifying a System Frame Number (SFN) may be included in the SIB2 block.

The parameter dl-Bandwidth may represent an indication of downlink bandwidth, such as the number of resource blocks ($N_{RB}$) (e.g., as defined in 3GPP TS 36.101). This parameter may be needed because different downlink bandwidth configurations may require different operations by UE 110. For example, for 1.4 MHz, UE 110 may need to receive Multicast Control Channel (MCCH) information every modification period. For higher downlink bandwidths, however, UE 110 may not be required to receive the MCCH every modification period.

The MBSFN-SubframeConfigList parameter may specify the MBSFN-subframes in the particular eMBMS cell (i.e., the subframes of a frame that are used for multicast-broadcast). This parameter may be an optional parameter and may be included in situations in which every subframe is not reserved for MBSFN in the eMBMS cell. When every subframe is to be used for MBSFN (e.g., as illustrated in FIG. 2B), this parameter may not be needed. An example of including the MBSFN-SubframeConfigList parameter in the SIB2 block would be where the cellular network configures only part of subframes (e.g., 80%) for eMBMS and the rest of the subframes (e.g., 20%) for other purposes (e.g., for carrier aggregation).

The MBSFN configuration may be the same or different between eMBMS cells associated with different MBSFN areas. For example, different eMBMS cells may provide different eMBMS services. UE 110 may handle the reception of the eMBMS services, from the different eMBMS cells, based on factors such as the UE's interest in the different services, signal quality, and/or other factors. As an example, consider a situation in which eMBMS cell 170-1 provides eMBMS services "1" and "2" and eMBMS cell 170-2 provides eMBMS services "2" and "3". Assume that UE 110 is interested in eMBMS service "2". Because the service is available from multiple eMBMS cells, UE 110 may determine internally which cell service should preferentially be received based, for example, on the signal strength of the cells (e.g., the UE may receive the eMBMS service from the eMBMS cell from which the UE receives a higher signal strength). The UE may then synchronize to the selected eMBMS cell to measure and decode the MBSFN subframes from the selected cell in order to receive the eMBMS data.

As mentioned, the SIB2 block may include parameters to enable UE 110 receive data from eMBMS cells 170. Based on the received parameters, UE 110 may perform initial measurements and receive eMBMS data with an eMBMS cell (at 420, "UE makes measurements and/or receive eMBMS data"). Based on the measurements and/or the received data, UE 110 may determine which eMBMS cell(s) to synchronize with and may synchronize with the determined eMBMS cell(s) (at 425, "Synchronize with MBSFN subframes transmitted by the eMBMS cell"). As illustrated in FIG. 4, UE 110 synchronizes with two eMBMS cells 170. Thus, the eMBMS cell configuration information may include configuration information that enables UE 110 to synchronize with the eMBMS cells.

3GPP SIB Type 13 ("SIB13") blocks may contain information needed to acquire MBMS control information associated with one or more MBSFN areas. As is additionally shown in FIG. 4, primary cell 160 may additionally transmit, as part of the eMBMS-cell configuration information, a SIB13 block to UE 110 (at 430, "SIB13 configuration parameters"). As with the SIB2 block, the SIB13 block may include, in addition to existing parameters, additional parameters used to enable the techniques discussed herein. One example set of the parameters that may be included in SIB13 block are illustrated in Table II, below.

TABLE II

System Information Block Type 13

SIB13 existing PCELL parameters
For each eMBMS supplementary cell {
    CellIdentity
    MBSFN-AreaInfoList
    MBMS-NotificationConfig -- Optional
}

As shown in Table II, the SIB13 block may include a number of parameters that correspond to existing configuration parameters to configure a UE for eMBMS services ("SIB13 existing PCELL parameters"). The SIB13 block may additionally include, for example, for each eMBMS cell 170 that is supported by primary cell 160, the parameters: CellIdentity, MBSFN-AreaInfoList, and MBMS-NotificationConfig (optional parameter).

The parameter CellIdentity may correspond to the CellIdentity parameter in the SIB2 block, and may be used to unambiguously identify a cell within a PLMN. The MBSFN-AreaInfoList parameter may contain information required to acquire MBMS control information associated with one or more MBSFN areas. The MBSFN-AreaInfoList parameter may be implemented similarly to the corresponding parameter defined in 3GPP TS 36.331.

The parameter MBMS-NotificationConfig may specify the MBMS notification related configuration parameters that are applicable for all MBSFN areas, as defined in 3GPP TS 36.331. The MBMS-NotificationConfig may be an optional parameter that may be used when the network transmits PDCCH (Physical Downlink Control Channel). If this parameter is not present, UE 110 may instead read the MCCH every modification period.

UE 110 may receive signaling parameters (eMBMS cell specific information) from the synchronized eMBMS cells. The signaling parameters may include MCCH and Multicast Channel Scheduling Information (MSI) (at 435, "MCCHs, MSI, and/or other eMBMS signaling information"). In one implementation, the signaling may include MCCH Change Notifications, which may be a notification, from an eMBMS cell 170, of a change in the MCCH.

In one implementation for implementing the signaling at 435, in which the MBMS-NotificationConfig field (Table II) is used, supplementary eMBMS cells 170 may transmit PDCCH information, indicating the MCCH Change Notifications, in the multicast subframes specified in the MBMS-NotificationConfig field. The MCCH Change Notifications may be transmitted using Downlink Control Information (DCI) format 1C. For all other subframes (i.e., the subframes not specified in the MBMS-NotificationConfig field), the network (e.g., the eMBMS cells) does not transmit PDCCH. In this manner, Orthogonal Frequency Division Multiplexing (OFDM) symbols for PDCCH are not used in the other subframes. Accordingly, in the other subframes in which PDCCH is not configured, all of the OFDM symbols can be used for eMBMS operations and hence increase spectral efficiency of the MBSFN transmissions. Additionally, UE 110 doesn't need to read the MCCH every modification period and can save power.

In an alternative implementation for implementing the signaling at 435, the network (e.g., the eMBMS cells) may completely refrain from transmitting the PDCCH. In this situation, although OFDM symbols in a subframe can be used for MBSFN transmissions. In this manner, radio capacity is relatively high and the implementation may be relatively easy from the perspective of UE 110. However, UE 110 may need to read the MCCH every modification period, which may consume more power.

Referring back to FIG. 4, primary cell 160 may transmit a SIB type 15 (SIB15) block to UE 110 (at 440, "SIB15"). The SIB15 block may include information that guides UE 110 in selecting or reselecting eMBMS cells. The SIB15 block may include: (1) a list of eMBMS Service Area Identifiers (SAI) for the current frequency; (2) a list of neighboring frequencies that provide eMBMS services, and/or (3) a list of eMBMS SAIs for a specific frequency. UE 110 may respond to the SIB15 block with a message, such as a Radio Resource Control (RRC) message, that includes a list of frequencies at which the UE is interested in receiving eMBMS services (at 445, "Interest Indicator"). eMBMS cells 170 may transmit the substantive broadcast transmissions as Multicast Traffic Channels (MTCH) (at 450, "MTCH data"). UE 110 may receive the substantive data from different supplementary eMBMS cells 170.

Figure 5:
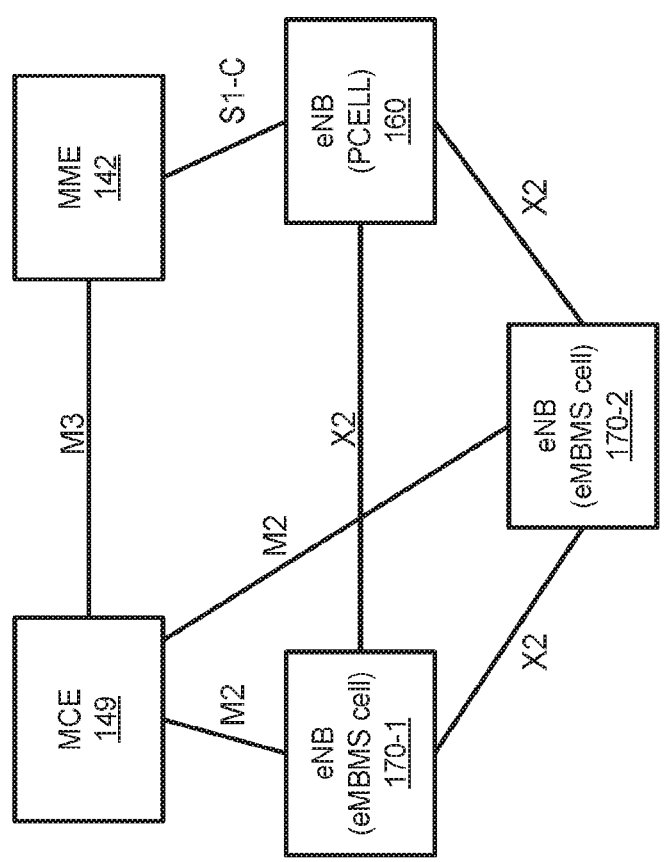
FIG. 5 is a diagram illustrating example interfaces between network elements used in the first embodiment.

FIG. 5 is a diagram illustrating example interfaces between network elements used in the first embodiment. As shown, MCE 149 may communicate with eMBMS cells 170-1 and 170-2 using the M2 interface. MCE 149 and MME 142 may communicate using the M3 interface. The eNBs that implement eMBMS cells 170-1 and 170-2, and primary cell 160, may communicate with each other using the X2 interface. MME 142 and primary cell 160 may communicate using the S1-C interface. The interfaces described herein, including the M2, M3, S1-C, and X2 interfaces, may be logical interfaces as described by the 3GPP technical standards. Consistent with aspects described herein relating to the first embodiment, eMBMS cells 170-1 and 170-2 and primary cell 160 may exchange eMBMS signaling information over the X2 interface. For example, eMBMS cell 170-1 may transmit the eMBMS-cell configuration information, over the X2 interface information, to primary cell 160. For example, information for the SIB2 block (e.g., as discussed in FIG. 4 at 415) may be transmitted, over the X2 interface, from eMBMS cell to primary cell 160.

The first embodiment, as particularly described above with respect to FIGS. 3-5, may provide a number of potential advantages. For instance, the spectral capacity of the eMBMS cells, for delivering eMBMS services, may be increased relative to existing implementations. Additionally, signaling overhead may be reduced in the broadcast transmissions as configuration information relating to the eMBMS cells may be communicated by the primary cell. Also, because the UE is able to send an indication of interest for eMBMS services, the network can plan the eMBMS deployment based on the expressed interest of the UEs in certain eMBMS services.

The second embodiment, in which the eMBMS cells may be a standalone eMBMS cells (e.g., such as eMBMS cell 170-4, shown in FIG. 1C), will next be discussed. In the second embodiment, eMBMS cell configuration messages are transmitted from eMBMS cells. At least one subframe, transmitted by the standalone cell, may be a non-MBSFN subframe. The non-MBSFN subframe may be used to exchange synchronization information and Physical Broadcast Channel (PBCH) configuration information. The other subframes may be MBSFN subframes.

Figure 6:
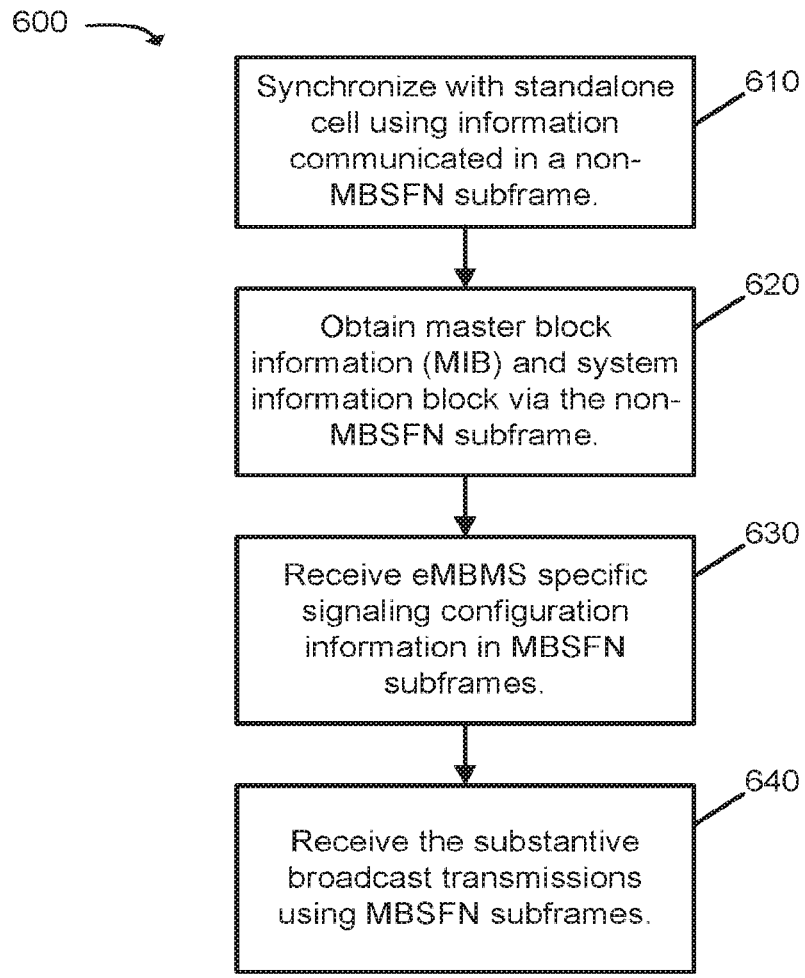
FIG. 6 is a flowchart illustrating an example process relating to increasing the spectral capacity of an eMBMS cell consistent with the second embodiment.

FIG. 6 is a flowchart illustrating an example process 600 relating to increasing the spectral capacity of an eMBMS cell consistent with the second embodiment.

UE 110 may synchronize with the standalone cell using information communicated in a non-MBSFN subframe (block 610). A standalone eMBMS cell, such as eMBMS cell 170-4, may transmit a Primary Synchronization Signal (P-SS) and a Secondary Synchronization Signal (S-SS) based on the existing 3GPP standards. That is, UE 110 may acquire, from P-SS, the physical cell ID (PCI) and may perform frame synchronization, which may enable the UE to read system information blocks from the network. From the S-SS, UE 110 may obtain a physical cell identity group number.

Process 600 may further include obtaining the MIB and SIB1 message (block 620). The MIB and SIB1 may be transmitted within the non-MBSFN subframes, such as part of the Physical Broadcast Channel (PBCH). The MIB and SIB1 messages may be system information that is needed, by the UE, to decode the MBSFN subframes. An additional optional parameter may be included in the MIB or SIB1 and may indicate whether the cell is an eMBMS cell. When the parameter indicates that the cell is an eMBMS cell, the UE may determine the cell configuration and perform eMBMS specific operations.

The SIB1 block may include scheduling information for the SIB2, SIB13, SIB15, and SIB16 blocks, as defined in the existing 3GPP standards. The PDCCH may not be configured for all of the subframes. Instead, as with the first embodiment, it may be optional as to whether the network will configure PDCCH for only MCCH-change-notification or not configure the PDCCH. The remainder of the subframes may be configured as MBSFN subframes.

Process 600 may further include receiving eMBMS specific signaling configuration or control information (e.g., MCCH and MSI) in the MBSFN subframes (block 630). That is, based on the system information received in block 620, the UE may decode the MBSFN subframes to obtain the eMBMS specific signaling configuration information.

Process may further include receiving the substantive broadcast transmissions using the MBSFN subframes (block 640). For example, using the eMBMS specific signaling, the UE may be able to obtain desired data from the Multicast Traffic Channel (MTCH) in broadcast MBSFN subframes.

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software.

Figure 7:
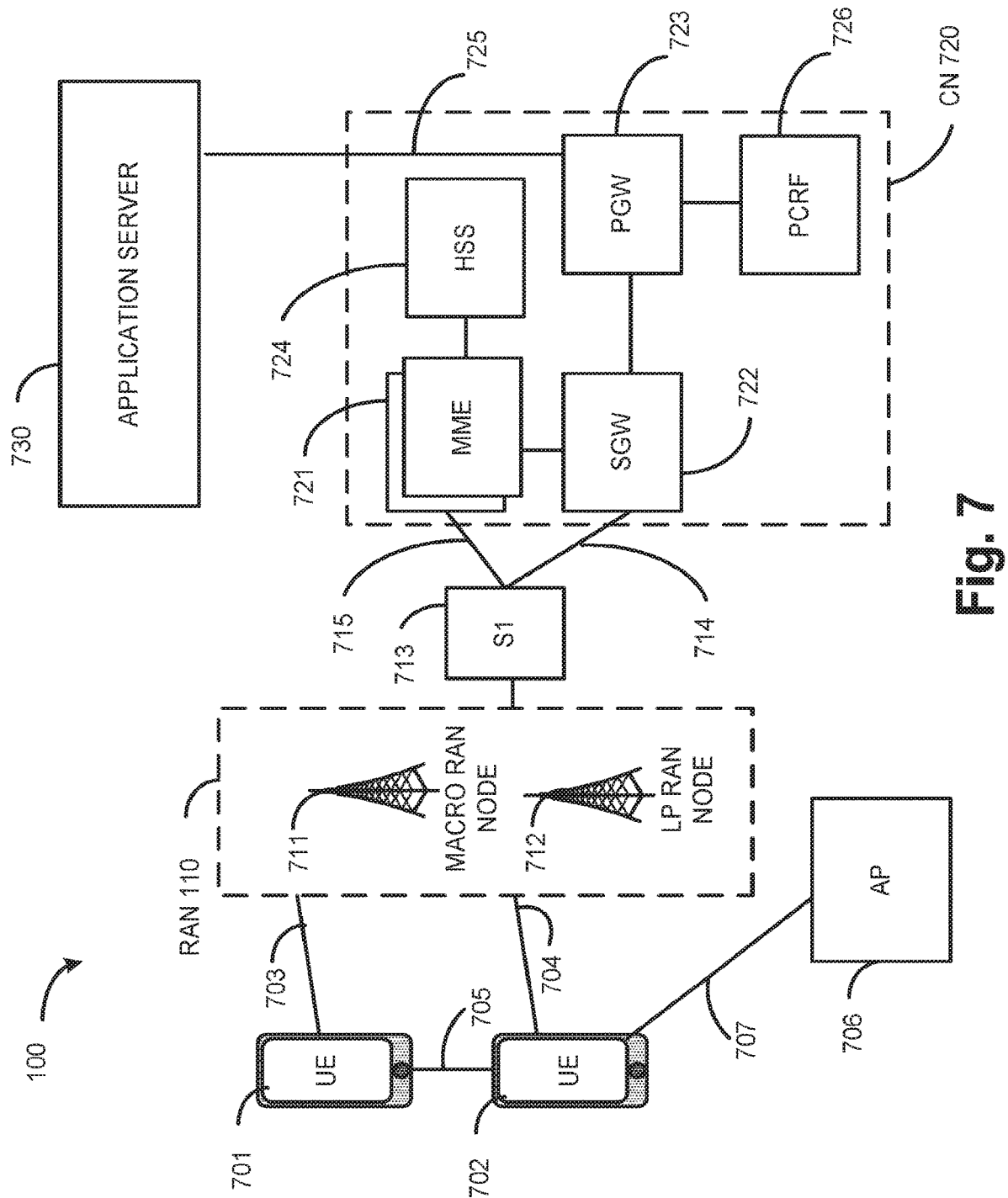
FIG. 7 illustrates an architecture of a system of a network in accordance with some embodiments.

FIG. 7 illustrates an architecture of a system 700 of a network in accordance with some embodiments. System 700 illustrates a number of elements similar to those shown in FIG. 1A. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 902.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 9).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The PGW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the PGW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The PGW 723 may further be a node for policy enforcement and charging data collection Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
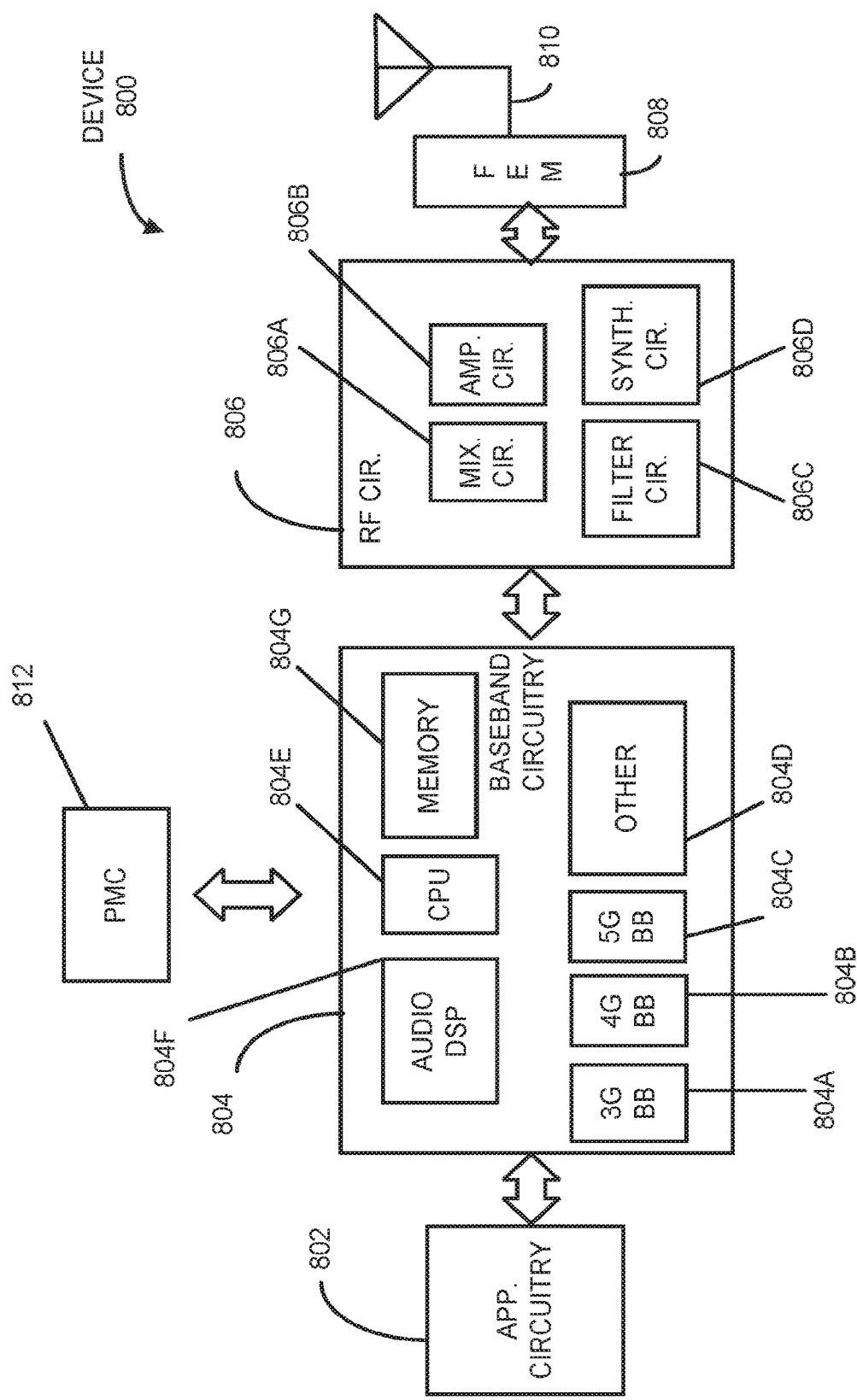
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU)

804E The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity.

During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
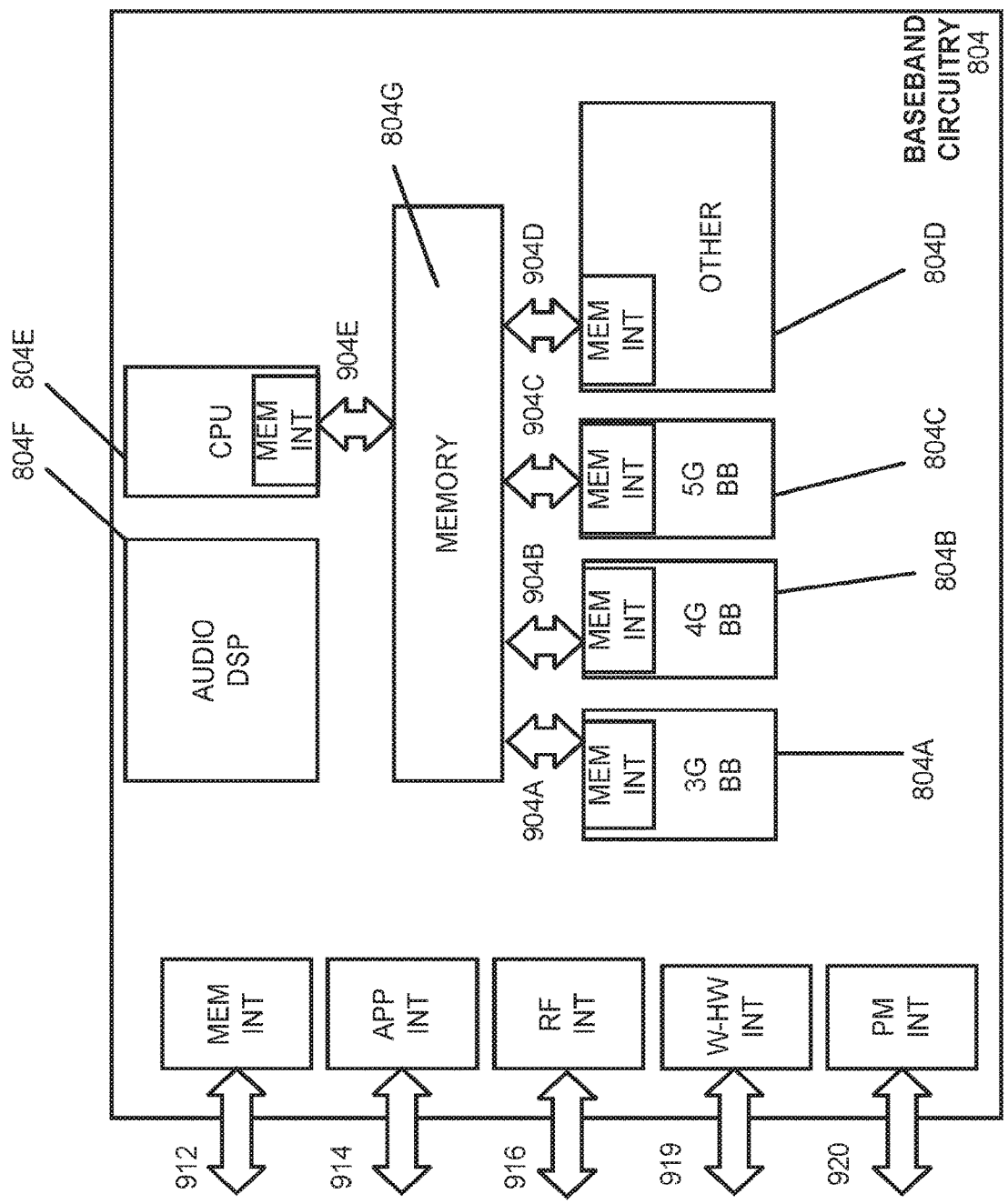
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-704E and a memory 804G utilized by said processors. Each of the processors 804A-704E may include a memory interface, respectively, to send/receive data to/from the memory 804G.

The baseband circuitry 904 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth@components (e.g., Bluetooth® Low Energy), Wi-Fi® components, and other communication components), and a power management interface 920 (e.g., an interface to send/receive power or control signals to/from the PMC 812).

Figure 10:
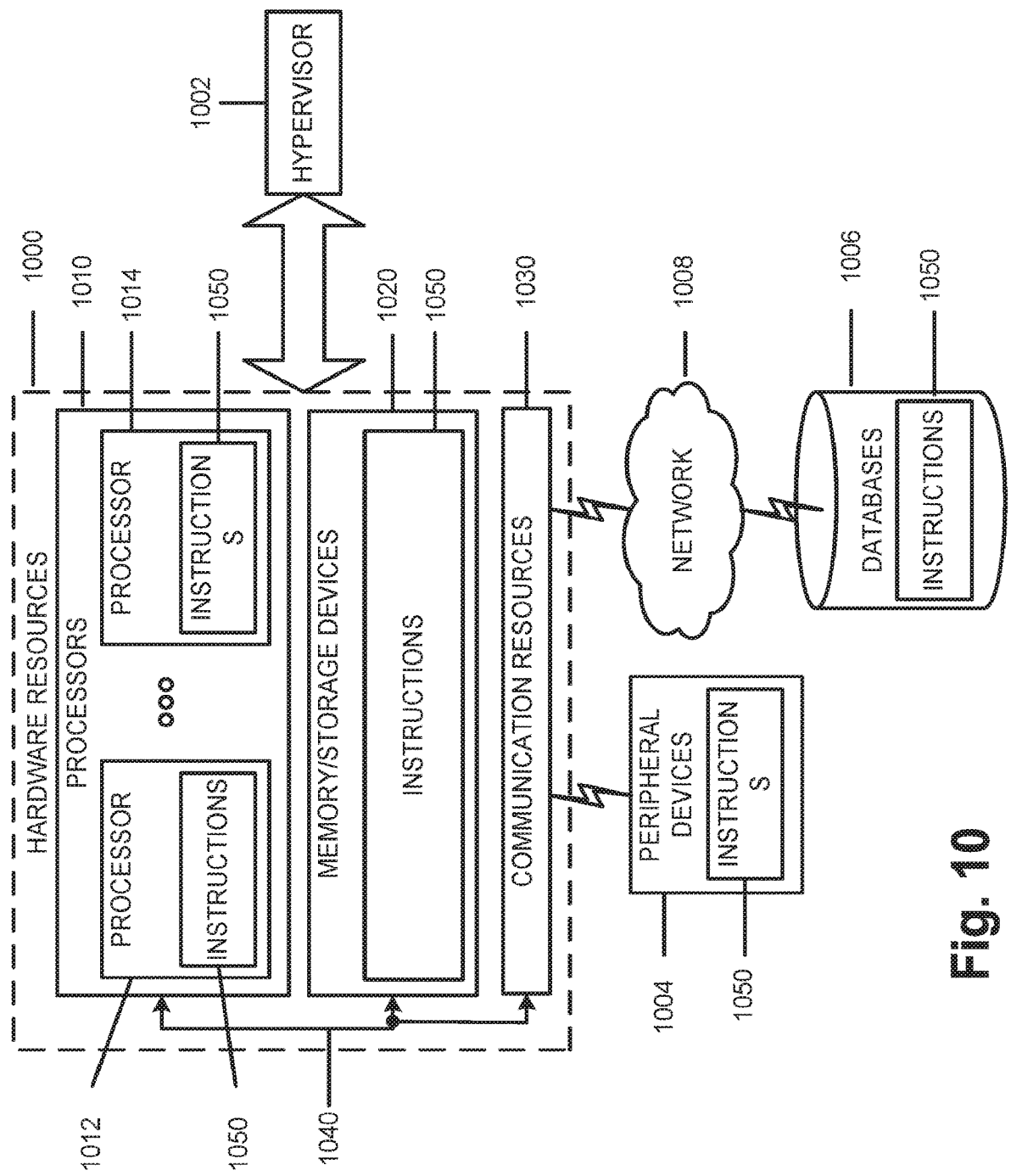
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

A number of examples, relating to implementations of the techniques described above, will next be given.

In a first example, an apparatus for a baseband processor of a UE comprises a radio frequency (RF) interface to RF circuitry; and one or more baseband processors to: process system information, received via the RF interface and from a standalone cell of a cellular network, that relates to reception of Multimedia Broadcast Multicast Services (MBMS) from the standalone cell, the system information being received from a non-Multicast-Broadcast Single Frequency Network (non-MBSFN) subframe; decode, based on the system information, MBSFN subframes transmitted by the standalone cell; determine, from the decoded MBSFN subframes, MBMS control information; and receive, via the RF interface and based on the decoded MBMS control information, a Multicast Traffic Channel (MTCH) that is broadcast by the standalone cell using the MBSFN subframes.

In example 2, the subject matter of example 1, or any of the preceding examples, wherein the MBMS control information includes information from a Multicast Control Channel (MCCH).

In example 3, the subject matter of examples 1 or 2, or any of the preceding examples, wherein the standalone cell is a MBMS cell that is dedicated to MBMS transmissions.

In example 4, the subject matter of examples 1, 2, or 3, or any of the preceding examples, wherein the system information includes Master Information Block (MIB) and System Information Block (SIB) Type 1 messages.

In example 5, the subject matter of examples 4, or any of the preceding examples, wherein the SIB Type 1 message includes scheduling information for one or more of SIB Type 2 messages, SIB Type 13 messages, SIB Type 15 messages, and SIB Type 16 messages.

In example 6, the subject matter of examples 1 or 2, or any of the preceding examples, wherein the standalone cell transmits only downlink data.

In a seventh example, a UE may comprise: a computer-readable medium containing processing instructions; and one or more processors to execute the processing instructions to: receive system information, from a standalone cell of a cellular network, that relates to reception of Multimedia Broadcast Multicast Services (MBMS) from the standalone cell, the system information being received in a non-Multicast-Broadcast Single Frequency Network (non-MBSFN) subframe; decode, based on the system information, MBSFN subframes transmitted by the standalone cell; determine, from the decoded MBSFN subframes, MBMS control information; and receive, based on the decoded MBMS control information, a Multicast Traffic Channel (MTCH) that is broadcast by the standalone cell using the MBSFN subframes.

In example 8, the subject matter of examples 7, or any of the preceding examples, wherein the MBMS control information includes information from a Multicast Control Channel (MCCH).

In example 9, the subject matter of examples 7, or any of the preceding examples, wherein the standalone cell is a MBMS cell that is dedicated to MBMS transmissions.

In example 10, the subject matter of examples 7, 8, or 9, or any of the preceding examples, wherein the system information includes Master Information Block (MIB) and System Information Block (SIB) Type 1 messages.

In example 11, the subject matter of example 10, or any of the preceding examples, wherein the SIB Type 1 message includes scheduling information for one or more of SIB Type 2 messages, SIB Type 13 messages, SIB Type 15 messages, and SIB Type 16 messages.

In example 12, the subject matter of example 7, or any of the preceding examples, wherein the standalone cell transmits only downlink data.

In a 13$^{th}$ example, an Evolved NodeB (eNB) implementing a standalone cell comprises: a computer-readable medium containing processing instructions, and one or more processors to execute the processing instructions to: broadcast system information, that relates to reception of Multimedia Broadcast Multicast Services (MBMS) from the standalone cell, as non-Multicast-Broadcast Single Frequency Network (non-MBSFN) subframes; broadcast MBMS specific signaling information within MBSFN subframes; and transmit, based on the MBMS specific signaling information, a Multicast Traffic Channel (MTCH) that is broadcast by the standalone cell using the MBSFN subframes.

In example 14, the subject matter of example 13, or any of the preceding examples, wherein the standalone cell transmits only downlink data.

In example 14, the subject matter of example 13, or any of the preceding examples, wherein the MBMS control information includes information from a Multicast Control Channel (MCCH).

In example 15, the subject matter of examples 13 or 14, or any of the preceding examples, wherein the standalone cell is a MBMS cell that is dedicated to MBMS transmissions.

In example 16, the subject matter of examples 13, 14, or 15, or any of the preceding examples, wherein the system information includes Master Information Block (MIB) and System Information Block (SIB) Type 1 messages.

In example 17, the subject matter of example 16, or any of the preceding examples, wherein the SIB Type 1 message includes scheduling information for one or more of SIB Type 2 messages, SIB Type 13 messages, SIB Type 15 messages, and SIB Type 16 messages.

In example 18, the subject matter of examples 13 or 14, or any of the preceding examples, wherein the standalone cell transmits only downlink data.

In a 19$^{th}$ example, an apparatus for a baseband processor of User Equipment comprises: a radio frequency (RF) interface to RF circuitry; and one or more baseband processors to: obtain, via the RF interface and from a first cell implemented by a first evolved NodeB (eNB), Evolved Multimedia Broadcast Multicast Services (eMBMS)-cell configuration information that relates to configuration, for eMBMS, of a second cell implemented by a second eNB; control synchronization, with the second cell, based on the eMBMS-cell configuration information; decode eMBMS specific signaling information, transmitted by the second cell, as Multicast-Broadcast Single Frequency Network (MBSFN) subframes; and receive, via the RF interface and based on the decoded eMBMS specific signaling information, a Multicast Traffic Channel (MTCH) that is broadcast by the second eNB using the MBSFN subframes.

In example 20, the subject matter of example 19, or any of the preceding examples, wherein the eMBMS-cell configuration information includes information that is transmitted as part of a System Information Block (SIB) Type 2 (SIB2) message, the SIB2 message including: an identifier of the second cell; and downlink carrier information associated with the second cell.

In example 21, the subject matter of example 19, or any of the preceding examples, wherein the SIB2 message further includes: information describing a downlink bandwidth configuration of the second cell.

In example 22, the subject matter of example 20 or 21, or any of the preceding examples, wherein the SIB2 message further includes: information indicating the particular subframes, in a subframe, that are MBSFN subframes.

In example 23, the subject matter of examples 19, 20, or 21, or any of the preceding examples, wherein the eMBMS-cell configuration information includes information transmitted as part of a System Information Block (SIB) Type 13 (SIB13) message, the SIB13 message including: information relating to the acquisition of eMBMS control information for MBSFN areas.

In example 24, the subject matter of example 19, or any of the preceding examples, wherein the one or more baseband processors are further to: obtain the eMBMS-cell configuration information for the second cell and for one or more additional cells corresponding to a same MBSFN area as the second cell.

In example 25, the subject matter of example 19, 20, or 21, or any of the preceding examples, wherein the eMBMS specific signaling information is received as part of Multicast Control Channel (MCCH) information received from the second cell.

In example 26, the subject matter of example 25, or any of the preceding examples, wherein the eMBMS specific signaling information includes an MCCH-Change-Notification that is received within one or more unicast subframes within a subframe, wherein the particular one or more unicast subframes of a subframe are designated as part of the eMBMS cell configuration information.

In example 27, the subject matter of example 19, or any of the preceding examples, wherein the second cell transmits only downlink data.

In example 28, User Equipment may comprise: a computer-readable medium containing processing instructions; and one or more processors to execute the processing instructions to: receive, from a first cell in a wireless cellular network, Evolved Multimedia Broadcast Multicast Services (eMBMS)-cell configuration information that relates to configuration, for eMBMS, of a second cell in the wireless cellular network; synchronize, with the second cell, based on the eMBMS-cell configuration information; receive signaling information from Multicast-Broadcast Single Frequency Network (MBSFN) subframes that are broadcast by the second cell; and receive, based on the signaling information, a Multicast Traffic Channel (MTCH) that is broadcast by the second cell in the MBSFN subframes.

In example 29, the subject matter of example 28, or any of the preceding examples, wherein the eMBMS-cell configuration information includes information transmitted as part of a System Information Block (SIB) Type 2 (SIB2) message, the SIB2 message including: an identifier of the second cell; and downlink carrier information associated with the second cell.

In example 30, the subject matter of example 29, or any of the preceding examples, wherein the SIB2 message further includes: information describing a downlink bandwidth configuration of the second cell.

In example 31, the subject matter of examples 28 or 29, or any of the preceding examples, wherein the SIB2 message further includes: information indicating the particular subframes, in a subframe, that are MBSFN subframes.

In example 32, the subject matter of examples 28 or 29, or any of the preceding examples, wherein the eMBMS-cell configuration information includes information transmitted as part of a System Information Block (SIB) Type 13 (SIB13) message, the SIB13 message including: information relating to the acquisition of eMBMS control information for MBSFN areas.

In example 33, the subject matter of example 33, or any of the preceding examples, wherein the one or more baseband processors are further to: obtain the eMBMS-cell configuration information for the second cell and for one or more additional cells corresponding to a same MBSFN area as the second cell.

In example 34, the subject matter of examples 28 or 29, or any of the preceding examples, wherein the eMBMS specific signaling information is received as part of Multicast Control Channel (MCCH) information received from the second cell.

In example 35, the subject matter of example 34, or any of the preceding examples, wherein the eMBMS specific signaling information includes an MCCH-Change-Notification that is received within one or more unicast subframes within a subframe, wherein the particular one or more unicast subframes of a subframe are designated as part of the eMBMS cell configuration information.

In example 36, the subject matter of example 28, or any of the preceding examples, wherein the second cell transmits only downlink data.

In a 37th example, an eNB may comprise: a computer-readable medium containing processing instructions, and one or more processors to execute the processing instructions to: transmit, to a second eNB, Evolved Multimedia Broadcast Multicast Services (eMBMS)-cell configuration information that includes information enabling User Equipment (UE) to synchronize with the eNB to receive Multicast-Broadcast Single Frequency Network (MBSFN) subframes, transmit, to the UE and via MBSFN subframes, eMBMS specific signaling to enable the UE to synchronize with the eNB; and broadcast, to the UE, Multicast Traffic Channel (MTCH).

In example 38, the subject matter of example 37, or any of the preceding examples, wherein transmitting the eMBMS-cell configuration information to the second eNB includes transmitting the eMBMS-cell configuration information using an X2 interface.

In example 39, the subject matter of example 37, or any of the preceding examples, wherein the eNB transmits only downlink data.

In example 40, the subject matter of example 37, or any of the preceding examples, wherein the eMBMS specific signaling is transmitted as part of Multicast Control Channel (MCCH) information.

In a 41st example, a method, implemented by a UE, may comprise: obtaining, via a radio frequency (RF) interface and from a first cell implemented by a first evolved NodeB (eNB), Evolved Multimedia Broadcast Multicast Services (eMBMS)-cell configuration information that relates to configuration, for eMBMS, of a second cell implemented by a second eNB; synchronize, with the second cell, based on the eMBMS-cell configuration information; receive eMBMS specific signaling information, transmitted by the second cell, as Multicast-Broadcast Single Frequency Network (MBSFN) subframes; and receive, based on the decoded eMBMS specific signaling information, a Multicast Traffic Channel (MTCH) that is broadcast by the second eNB using the MBSFN subframes.

In example 42, the subject matter of example 41, or any of the preceding examples, wherein the eMBMS-cell configuration information includes information that is transmitted as part of a System Information Block (SIB) Type 2 (SIB2) message, the SIB2 message including: an identifier of the second cell; and downlink carrier information associated with the second cell.

In example 43, the subject matter of example 42, or any of the preceding examples, wherein the SIB2 message further includes: information describing a downlink bandwidth configuration of the second cell.

In example 44, the subject matter of example 41 or 42, or any of the preceding examples, wherein the SIB2 message further includes: information indicating the particular subframes, in a subframe, that are MBSFN subframes.

In example 45, the subject matter of example 41 or 42, or 43, or any of the preceding examples, wherein the eMBMS-cell configuration information includes information transmitted as part of a System Information Block (SIB) Type 13 (SIB13) message, the SIB13 message including: information relating to the acquisition of eMBMS control information for MBSFN areas.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 3, 4, and 6, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:
1. An apparatus for User Equipment (UE), comprising:
a radio frequency (RF) interface to RF circuitry; and
one or more baseband processors to:
process system information, received via the RF interface and from a standalone cell of a cellular network, that relates to reception of Multimedia Broadcast Multicast Services (MBMS) from the standalone cell, the system information being received as part of a non-Multicast-Broadcast Single Frequency Network (non-MBSFN) subframe;
wherein the system information includes Master Information Block (MIB) and a System Information Block (SIB) type 1 message,
further wherein the SIB Type 1 message includes scheduling information for one or more of a SIB Type 2 message indicating parameters specifying MBSFN-subframes, a SIB Type 13 message indicating configuration parameters for MBMS services, and a SIB Type 15 message related to selecting or reselecting MBMS cells, decode, based on the system information, MBSFN subframes transmitted by the standalone cell;

determine, from the decoded MBSFN subframes, MBMS control information; and receive, via the RF interface and based on the decoded MBMS control information, a Multicast Traffic Channel (MTCH) that is broadcast by the standalone cell using the MBSFN subframes.

2. The apparatus of claim 1, wherein the MBMS control information includes information from a Multicast Control Channel (MCCH).

3. The apparatus of claim 1, wherein the standalone cell is not associated with a primary cell.

4. The apparatus of claim 1, wherein the standalone cell does not support uplink communication.

5. An User Equipment (UE) comprising:
a computer-readable medium containing processing instructions; and
one or more processors to execute the processing instructions to:
receive system information, from a standalone cell of a cellular network, that relates to reception of Multimedia Broadcast Multicast Services (MBMS) from the standalone cell, the system information being received in a non-Multicast-Broadcast Single Frequency Network (non-MBSFN) subframe;
wherein the system information includes Master Information Block (MIB) and a System Information Block (SIB) type 1 message,
further wherein the SIB Type 1 message includes scheduling information for one or more of a SIB Type 2 message indicating parameters specifying MBSFN-subframes, a SIB Type 13 message indicating configuration parameters for MBMS services, and a SIB Type 15 message related to selecting or reselecting MBMS cells,
decode, based on the system information, MBSFN subframes transmitted by the standalone cell;
determine, from the decoded MBSFN subframes, MBMS control information; and
receive, based on the decoded MBMS control information, a Multicast Traffic Channel (MTCH) that is broadcast by the standalone cell using the MBSFN subframes.

6. The UE of claim 5, wherein the MBMS control information includes information from a Multicast Control Channel (MCCH).

7. The UE of claim 5, wherein the standalone cell is a MBMS cell that is not associated with a primary cell.

8. The UE of claim 5, wherein the standalone cell does not support uplink communication.

9. An Evolved NodeB (eNB) implementing a standalone cell, the eNB comprising:
a computer-readable medium containing processing instructions; and
one or more processors to execute the processing instructions to:
broadcast system information, that relates to reception of Multimedia Broadcast Multicast Services (MBMS) from the standalone cell, as non-Multicast-Broadcast Single Frequency Network (non-MBSFN) subframes;
wherein the system information includes Master Information Block (MIB) and a System Information Block (SIB) type 1 message,
further wherein the SIB Type 1 message includes scheduling information for one or more of a SIB Type 2 message indicating parameters specifying MBSFN-subframes, a SIB Type 13 message indicating configuration parameters for MBMS services, and a SIB Type 15 message related to selecting or reselecting MBMS cells,
broadcast MBMS specific signaling information within MBSFN subframes;
transmit, based on the MBMS specific signaling information, a Multicast Traffic Channel (MTCH) that is broadcast by the standalone cell using the MBSFN subframes.

10. The eNB of claim 9, wherein the MBSFN subframes include MBMS control information that includes information from a Multicast Control Channel (MCCH).

11. The eNB of claim 9, wherein the standalone cell is a MBMS cell that is does not support unicast communication.

12. The eNB of claim 9, wherein the standalone cell does not support uplink communication.

* * * * *